United States Patent [19]

Dashwood et al.

[11] 4,320,941
[45] Mar. 23, 1982

[54] OPTICAL COMPENSATORS FOR CINEMATOGRAPHY

[75] Inventors: Nigel J. R. Dashwood, Royston; Dexter R. Plummer, Ongar, both of England

[73] Assignee: PA Management Consultants Limited, London, England

[21] Appl. No.: 86,797

[22] Filed: Oct. 22, 1979

[30] Foreign Application Priority Data

Nov. 7, 1978 [GB] United Kingdom ............... 29552/78

[51] Int. Cl.³ ............................................. G03B 41/10
[52] U.S. Cl. ................................... 352/111; 352/108
[58] Field of Search ............... 352/108, 110, 111, 112, 352/105, 106, 115, 62, 84, 60

[56] References Cited

U.S. PATENT DOCUMENTS

| | | | |
|---|---|---|---|
| 1,154,835 | 9/1915 | Bauersfeld | 352/105 |
| 1,245,844 | 11/1917 | Wescott | 352/111 |
| 1,309,672 | 7/1919 | Wescott | 352/110 |
| 1,367,488 | 2/1921 | Lysle . | |
| 1,375,922 | 4/1921 | Lysle | 352/111 |
| 1,616,054 | 2/1927 | Lysle . | |
| 1,690,770 | 11/1928 | Continsouza et al. | 352/115 |
| 1,780,123 | 10/1930 | Florine | 352/115 |
| 1,903,820 | 4/1933 | Kosken . | |
| 2,778,288 | 1/1957 | Steffen | 352/60 |
| 3,437,406 | 4/1969 | Rowell | 352/60 |
| 4,113,367 | 9/1978 | Fritzler | 352/108 |
| 4,149,782 | 4/1979 | Andoh et al. | 352/115 |

FOREIGN PATENT DOCUMENTS

| | | | |
|---|---|---|---|
| 1119 | 8/1926 | Australia | 352/110 |
| 90473 | 10/1936 | Austria . | |
| 984144 | 7/1951 | France . | |

*Primary Examiner*—Monroe H. Hayes

*Attorney, Agent, or Firm*—Oblon, Fisher, Spivak, McClelland & Maier

[57] ABSTRACT

A device is described for compensating for the movement of a cinematographic films through a camera or projector. By using the device, so intermittent film motion through the gate of the camera or projector can be dispensed with and the film can be moved continuously therethrough the camera or projector.

The invention lies in the use of a plurality of inverting reflectors typically Amici prisms (70) moving in the same direction as the film (20) but at one half the speed of the film. The path of the prisms (70) is determined by a straight line segment (74) of a track (72), the straight line segment (74) being parallel to the direction of movement of the film (20).

By illuminating the film over a width of at least one and a half frames using a condenser lens (18) so a number of partial images are obtained which are reconstituted in the optics so as to form in the projected image a composite frame which in general will be made up of two or three images of frame parts from two or three adjoining frames.

Different devices for achieving the same end comprise a helically grooved drum formed with a 90° included angle helical groove having a mirrored finish, an array of prisms mounted on a caterpillar track part of which is straight and arranged parallel to a straight film path, a disc having corner cube indents or optical roofs formed in a plane surface thereof and circularly arranged therearound, and a disc having slots therein and prisms slideable within the slots with a guide arranged to extend tangentially so as to interact with plane faces of the prisms to cause the latter to be constrained to move in a straight line over an appropriate part of the rotation of the disc.

28 Claims, 22 Drawing Figures

Continuation of light path from 9a

Continuation of light path from 9c

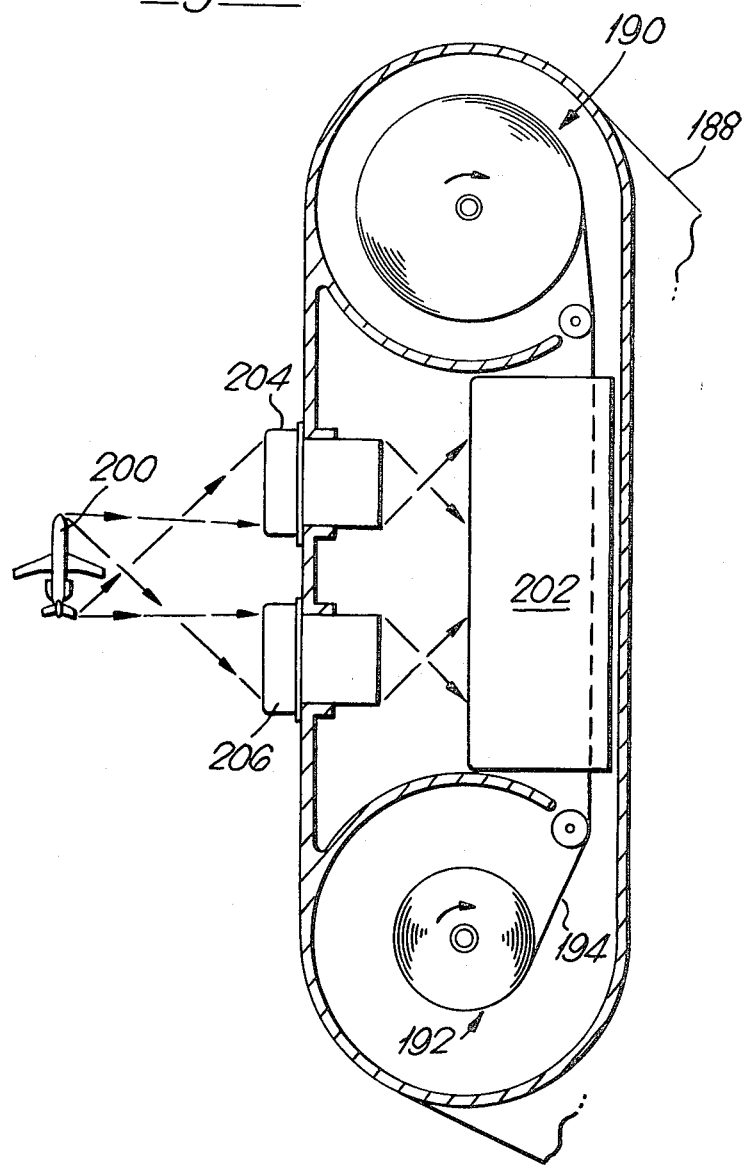

OPTICAL COMPENSATORS FOR CINEMATOGRAPHY

FIELD OF THE INVENTION

This invention concerns optical compensators used in cinematography for optically displacing a moving image so as to compensate for image movement and deflectively arrest the image movement. Such devices may be used either in the optical system of a camera so that a scene which contains moving elements can be effectively photographed for subsequent reproduction using a similar optical compensator in the optical system of the projection device or a common intermittent motion projector. Alternatively such compensators can be used in a modified projection device for projecting conventional cinematographic film containing a sequence of exposures.

BACKGROUND TO THE INVENTION

In the art of cinematography two methods are commonly used to take and project a series of images which gives the subjective impression of a continuously moving picture. The best known and most common method involves stopping a length of film in the correct position relative to the optical system of the camera whilst an image is exposed on the film. After exposure the film is moved on until the next vacant position on the film is available to be exposed and a further exposure is made thereon. The sequence is repeated until the whole film is exposed. Projection involves the reverse procedure in which the film is moved continuously through a projector but in the region of the light path through the optical system of the projector, the film is moved in a series of jerks which by appropriate alignment will allow the different exposed regions or frames as they are referred to, to be aligned momentarily in the optical path and projected. By using an appropriate shutter mechanism, the light is cut off during the pull down time so that only the series of images corresponding to the sequence of frames is projected onto the screen.

Further light loss results by the incorporation of further shuttering to increase the flicker rate and reduce its subjective effects.

In a less common method the film is moved continuously through a projector and one or more moving optical components operate so as to arrest the movement of the frame images so as to produce a stationary display on the screen with each image (or frame) displacing the last at a repetition rate determined by the speed of movement of the film. The compensator can be thought of as comprising a series of facets which move in synchronism with the film in such a way that by appropriate alignment of the film and the facets, one facet will register with each frame in turn and with synchronised movement. As one frame of the film passes beyond the alignment position with one facet, the next frame of the film aligns with the next facet and so on.

PRIOR ART

One form of optical compensator is described in U.S. Pat. No. 1,401,346 of Mechau. This produces synchronised alignment between successive film frames and rotating optical facets and replaces one frame with another in succession along a single axis for projection purposes. The movement of the facets and the film is synchronised so that each facet aligns with each frame.

U.S. Pat. No. 1,154,835 to Bauersfeld illustrates an arrangement in which a plurality of optical devices are arranged round a drum which is rotated relative to the film so as to compensate for movement of the film. The speed of the optical inverting devices is the same as the speed of the film so as to produce the required immobilisation.

U.S. Pat. No. 1,975,111 to Lysle also illustrates an immobiliser in which the film is moved in a diagonal manner relative to an array of optical devices which are moved around a caterpillar type track. The direction of motion is not the same and a merging effect is obtained by combining different images from different diagonally separate regions of the film.

U.S. Pat. No. 2,972,280 to Kudar illustrates a further alternative arrangement in which two frames of a film are illuminated and merged optically for projection purposes so that each frame is mixed with at least one other frame in all but one instant in time.

U.S. Pat. No. 2,400,885 to Miller also describes an optical compensator for use with a camera. In order to form a series of images, stationary relative to the film and displaced from each other in time and position on the film, this device makes use of a multiplicity of light beam inverting devices. These devices are of such a nature that when placed in the path of an incident beam of light they will either transmit or reflect as the case may be a beam of light which is a continuation of the incident beam except that it is inverted with respect to a certain neutral line. The neutral line maintains a fixed position and orientation with reference to the light beam inverting mechanism. The speed of the light inverting devices and the speed of the film is the same. The compensator thus causes the light beam transmitted or reflected from the light beam inverting devices to have a translatory motion such as to give it the appearance of having come from a primary image moving in the same direction as and at twice the speed of the light beam inverting mechanism. The transmitted or reflected beam is then passed through a lens or lens system to form a secondary image on a continuously moving film and the lens system is designed so that the speed of the secondary image relative to the apparent speed of the primary image will be such that the secondary image will move at a speed equal to that of the film. It will be seen that it is a prerequisite of this system that the film and the light beam inverting devices are moved synchronously.

U.S. Pat. No. 3,049,049 to Katona discloses an immobilizing device in which a star wheel having mirror facets rotates in synchronism with the film, with the facet apertures moving in the same direction as the film in their immobilizing mode. The facets are described as capable of subtending up to 90° but the purpose of the included angle is to separate the light beams, and if an included angle of 90° were used, no separation would be achieved. The practical and optimum angle appears to be in the region of 30°–45° and since there is slip described of taught (as between film and facets) the reference cannot be considered relevant to the present invention.

A further design of compensator is described in U.S. Pat. No. 4,113,367. This utilises a multi-faceted reflecting polygon scanner for producing an overlap frame dissolve of sequential frames for optically immobilizing a projected image. A development of this device is illustrated and described in U.S. Pat. No. 4,126,386. This specification also includes a detailed review of the prior art referred to above and other prior art relative to the subject of optical compensators.

U.S. Pat. No. 1,780,123 to Florine describes one of a different class of compensator which uses lenses arranged around a disc the axis of which is parallel to the direction of projection and each lens being engaged in a frame or bearing mounted to slide relative to the disc in a radial direction and pressed towards the periphery of the disc by springs. The immobilization of the final image is effected by moving the array of lenses on the disc 14 in the same direction as the direction of travel of the film frames through the aperture 1.

The foregoing specifications are illustrative only of a large number of specifications describing prior art systems and in general it can be stated that all such systems have one serious disadvantage which the present invention seeks to avoid namely, all of the devices have restricted aperture so that a large amount of light cannot be transmitted through the system and whilst the devices are, therefore, interesting from an academic point of view they are of no practical use for projecting films in view of the very restricted amount of light they can handle. This is particularly the case when lenses are used on the immobilizing optical devices.

It is, therefore, a primary object of the present invention to provide an optical compensator which does not suffer from this disadvantage but at the same time does not require the film to be arrested during its movement through the gate of a projecting device.

It is also an object of the present invention to provide an image immobilizing compensator which with appropriate reversal of the light path therethrough can be used to cause a series of images to be exposed upon a moving film in a camera in such a way that the movement of the film through the camera gate does not have to be arrested as in a conventional movie camera.

Most of the aforementioned systems all suffer from one form of optical aberration or another. Usually this arises from the attempt in the system to focus a curved and/or rotating moving image onto a flat screen. Whilst some optical compensation can be provided for example in the focusing lens assembly to overcome such aberration, the effect becomes noticeable with increased magnification and whilst devices have been constructed for use as film editors magnification to a greater level than that required for personalised viewing for editing purposes has in the past failed to produce an acceptable picture.

Projectors and cameras using a continuous film movement with appropriate optical compensators have obvious advantages not least of which are the reduced damage to the film due to the avoidance of rapid acceleration and deceleration, no film scratching at the gate, flicker free viewing and reduced film stock thickness since the film does not need to be as strong as hitherto. Noise is reduced due to the absence of a shutter and intermittent gate mechanism and last but not least such devices can be operated at low and high frame rates and variable speeds.

Despite these many advantages continuous motion cinematography is not universal basically for two reasons.

1. The performance of an optical compensator is inevitably a compromise so that either the movement of the image is not completely cancelled or the quality of the instantaneous image is degraded or both.

2. All of the optical compensators hitherto described have either a substantial optical path length and/or other optical restrictions, consequently a restricted aperture as before mentioned. Consequently the brightness of the final image is limited.

It is therefore a further object of the present invention to provide an optical compensator typically for use in a cinematographic projector to get a higher brightness level in the projected image than has hitherto been possible from known optical devices and to give either theoretically perfect or near perfect optical compensation.

It is a still further object of the present invention to provide an optical compensator which changes the projected image of a frame of the film with constant relative intensity of illumination.

Greatly improved light levels have been claimed in the past for previous systems because of uninterrupted illumination. The improvement gained however is at best a factor of ×2 relative to the light level of an intermittent motion system (i.e. an improvement of one optical stop). In the systems of the prior art, this does not in fact compensate for the loss of light due to the restriction by all such systems on the projection (or camera) lens aperture.

To the extent that the device can be used in a camera, it is a still further object of the invention to provide an optical compensator which can be used in a camera.

DEFINITIONS

In the following Description the term "frame" means either a discrete picture on an exposed film or a region of an unexposed film on which a discrete picture is to be formed.

In the following Description the term "film pitch" is in the case of a device in which all the optical surfaces of the compensating devices are plane, the frame repeat distance measured along the length of the film.

In the standard 35 mm film the frame height is 19 mm and the frame repeat distance is 19.05 mm.

THE INVENTION

According to the present invention an optical device for compensating for the movement of a cinematographic film along a film path a region of which is crossed by a light path, comprises a plurality of image inverting reflectors (hereinafter referred to as facets) each of which has two mutually perpendicular plane light reflecting surfaces for inverting light entering the facet and orientated so as to deflect all light passing therethrough, means defining a facet path along which the facets can move, the facet path also crossing the light path and at least in the region of the said crossing being generally parallel to the film path, means for effecting movement of the facets along the facet path so that each in turn crosses the said light path, the movement of the facets being in the same direction as the movement of the film but at a different speed from that of the film.

In order that the final image shall appear correctly, the dimensions of the facets are selected so that the facet pitch (as measured along the facet path) is an integral multiple N (N=1, 2, 3 etc.) of one half the film pitch, and the facet speed is controlled at one half the film speed.

When fitted in a camera for exposing a sequence of frames on a length of unexposed film, the camera lens is arranged to focus light along the light path through the facets onto the said region of the film.

When fitted in a projector for illuminating and projecting a sequence of film frames the projection lamp and condenser lens are arranged to form a light beam along the light path to illuminate the film, and the projection lens focuses light remaining in the light beam after it has passed through the film and the facets.

Where perfect compensation is not a pre-requisite and an approximate compensation and immobilization is required or a special effect of a rolling image is desired, the facet speed or film speed can be varied so that the facet speed is no longer one half the film speed. It has been found by experiment that as long as parts of a facet do not exceed a speed of up to 65% of the film an image which is sufficiently immobilized for use in a toy viewing device will be produced.

The image inverting reflectors are conveniently identical but for special effects, a variation may be introduced as between one facet and the next or one group of facets and the next group of facets. Furthermore where reflecting corner cubes are used as the image inverters, the size orientation, and mounting of the corner cubes is not particularly critical since it is a characteristic of a corner cube that its orientation will not affect its inverting properties relative to the virtual image of the vertex of the corner cube.

A stationary window a size of which is chosen to block unwanted light may be provided at a convenient position in the system (for example close to the projection lens or at a screen or at an intermediate real image position) so as to permit only the light corresponding to the required series of images to pass therethrough.

A compensator constructed in accordance with the invention relies upon both differential motion between the film and the array of facets and the image translation properties of the image inverters making up the facets in the array. Correct immobilization requires that during any time interval less than or equal to that for which each facet is in active operation with the film, the relative displacement in the direction of film travel, between the film and the facet, plus the image translation caused by the facet, should at any instant in the time interval exactly balance out the effect of film displacement (in the direction of the film travel) during that time interval.

Suitable devices for use as facets in the invention include corner cube retroreflectors, and optical roofs.

Assuming that the remainder of the optical system is flawless, an undistorted final image will be obtained provided both the film and the facets move in straight line paths parallel to one another at least in the region of illumination. Any departure from parallelism or non-straight line path will introduce aberration in the final image unless appropriate steps are taken to optically correct such aberration. Non-parallelism introduces dynamic aberration which is very difficult to compensate for in practice.

To achieve true parallelism, an immobilizer embodying the invention will normally require discrete facets and a certain mechanical complexity which will probably limit true parallel motion to the larger film formats, typically 35 mm or greater.

A close approximation to the ideal arrangement is obtained by mounting the facets around a circular path providing that the diameter of the circle is sufficiently large. Thus for example the facets may be mounted on the surface of a disc or may be aligned around the circumferential edge of the disc. In the first arrangement, the film is moved parallel to the plane of the disc with the frames of the film registering with a part of the circular path of the facets, rotation of the disc and linear movement of the film producing the desired relative movement between the frames and the facets. Clearly if the radius of curvature of the circular array of facets is great enough, the short length of arc containing the two or three facets required for registration with the film frame at any instant, will approximate to a straight line, and appropriate immobilization of the images of the moving frames of the film is obtained by adjusting the speed of the facets relative to the film.

Where the facets are arranged around the circumferential edge of the disc, the film is most conveniently guided around the edge of the disc, for example on wheels bearing sprocket teeth, and which are rotatable separately from the disc containing the facets, the wheels being mounted on each or one side thereof.

The film path can be made parallel to the circular path of the facets to any required degree of accuracy merely dependant on the accuracy of construction of the component parts and since both film and facets follow circular paths around a common axis of rotation there will be no distortion akin to that in the previously described arrangement due to the non-straight line nature of the array of facets, except in the situation where the radius of curvature is infinite.

Depending on the particular facet type chosen, the former arrangement may suffer from a position dependant image twist in the plane of the image whilst the second arrangement just described has inter alia a position dependant twist perpendicular to the plane of the image. The aberrations on the screen in a projection mode of operation can be minimised by optical control (telecentricity, selective illumination and the like) and by increasing the diameter of the ring of facets.

Whilst keeping the relative speeds constant, different effects can be obtained by varying the aperture size and field of view of each of the facets. Clearly the facets must always encompass in their field of view the width of each of the frames of the film (measured across the width of the film) but the facet pitch may be less than or equal to or exceed the film pitch (measured in the direction of movement of the film).

It has been found that the transition from one projected frame to the next by the wiping action of the immobilizer takes a time equal to that for a single frame to be traversed by the boundary between two facets. Thus all immobilizers so far described as embodying the invention change projected frames in the same period of time which is, therefore, constant for any particular given film frame height (i.e. film pitch).

Where the facet pitch is equal to one half the film pitch then with the speed of the film equal to twice the speed of the facets, every frame of the film will be seen in the sequence of stationary images in the output of the device.

Where the facet pitch is equal to the film pitch and the speed of the film as before is equal to twice the speed of the facets, then it is found that only every other one of the frames of the film will appear in the sequence of stationary images in the immobilizer output.

In the general case, if the facet pitch is equal to M times the film pitch then only every 2Mth frame of the film will be displayed in the sequence of images in the output of the immobilizer.

Stereo projection of cinematographic film has commonly involved the display of two separate films which may or may not be incorporated on a single length of film. The eye perceives each channel by means of polarising the light or by means of special screens or by means of colour selection.

A compensator constructed in accordance with the present invention can be employed for stereo filming and projection by using film in which every second frame belongs to one channel and the interlaced frames belong to the other channel, the film moving at twice the normal single channel speed, with a consequent reduction in frame change time, and wherein there is a second light path which crosses the film path, for exposing or projecting the second channel frames, the facet pitch being made equal to the film pitch or an integral multiple N (N=1, 2, 3 etc.) times the film pitch.

When employed in a stereo camera, the latter must include second lens means for focusing light along the second light path through the facets onto a second region of the film.

When employed in stereo projection, the projector must illuminate two regions of the film (which may be adjoining) and produce the second light beam which passes separately through the facets, and second projection lens means is provided for focusing the light remaining in the second beam after it has passed through the film and the facets.

A compensator constructed in accordance with the invention can therefore provide two outputs derived from a single sequence of film frames and by appropriate coding of the two series of alternate film frames so that the projected images from the two alternate series of frames are readily distinguishable, and by appropriate viewing or projection of the two outputs onto a suitable screen, so a stereoscopic effect can be obtained. It will be realised that the series of pictures making up the one channel will never be seen in the series of pictures making up the other channel and vice versa. The linear speed of the film must be twice the single channel speed e.g. 48 frames per second as opposed to 24 frames per second.

It has been found that a refractive roof constitutes possibly the best reflective facet device. A refractive roof allows total internal reflection rather than pure mirror reflections and also allows a greater collection angle of light because for example in a projector the lens will "see" the virtual image at the apparent depth within the roof (equal to approximately ⅔ of the real depth for common glass). However, the projection lens must be designed to correct for the residual spherical and longitudinal chromatic aberrations then present.

Where a corner cube mirror reflector is employed as a facet, one reflective face of the cube can be arranged to move in its own plane and in some arrangements it is possible to split this third face from the corner cube and arrange the corner cube as a series of roofs and a stationary reflecting surface.

In one construction a facet comprises a roof section (effectively a 45°, −45°, −90° prism with the hypotenuse replaced by a roof) to give a geometrical efficiency greater than a simple two mirror facet.

An optical compensating device incorporating the invention operates in a simple wiping mode and when the facet field of view is equal to a half film pitch each part of the image is formed from light from only one frame of the film. This is quite distinct from previous types of optical compensator in which two or more images have been displayed simultaneously, one superimposed on the other and lap dissolve techniques have been applied so as to replace first one image and then the next and so on, in each case replacing the removed image with the image of a subsequent frame from the moving film.

It is interesting to note that in the basic example of the invention in which the linear speed of the film is twice that of the movement of the facet in the region of illumination and at which the facet pitch is equal to one-half the film pitch, there will never be a single frame displayed in the final image but instead the latter will always be a composite of partial images from two or three frames.

In a preferred embodiment of the invention, the facets comprise Amici prisms. This arrangement halves the optical path length between film and projector lens (as compared with an embodiment using corner cubes as the reflecting facets) and is thus in principle capable of passing four times as much light. The arrangement also gives better physical separation of the condenser optics and projection optics.

Light throughput in the projection mode can be improved by using a plurality of optical condensing devices which are located adjacent to the path of the film between the light source directing light onto the film, and the film, with means for moving the condensing devices in synchronism with the facets. The pitch of the optical condensing devices would normally be the same as the pitch of the facets.

Normally the facets will be similar in size and shape in order to facilitate manufacture, mounting, replacement, etc. Where they are similar, the pitch of the facets will be the spacing between corresponding points on adjacent facets. Where the facets are not all similar in construction but nevertheless are similar in function, the pitch of the facets is to be understood as being the spacing between the points (or lines) about which two adjoining facets respectively produce optical inversion.

The invention will now be described by way of example with reference to the accompanying drawings.

In the drawings:

FIG. 1 illustrates the principle of the compensator at the heart of the present invention, FIG. 2 shows how the light rays in a projector illuminate different regions of successive frames of a film and in the compensator of the invention are reconstructed to form a final image, FIG. 3 is a side view of a projector containing an image immobilizing device embodying the invention, FIG. 4 is a cross-section on the line IV IV in FIG. 3, FIG. 5 is a diagrammatic perspective view of a system incorporating a train of prisms as the optical inverting facets, FIG. 6 shows part of the device of FIG. 5 to a larger scale and in cross-section, FIG. 7 illustrates an alternative embodiment of the invention in which the facets are provided by the helical grooves in a worm gear profile, FIG. 8 is a side view of the arrangement shown in FIG. 7 with the optical path shown, FIGS. 9a, 9b, 9c and 9d, illustrate different stages during the projection of a series of interlaced frames so as to produce simultaneous projection of two series of frames typically for stereo projection.

FIG. 10a is a plan view of an alternative embodiment in which the immobilizer comprises a plurality of prisms arranged around a caterpillar track, FIG. 10b is a cross-section through the arrangement shown in FIG. 10a, with the light path shown.

FIG. 11 is a plan view of another embodiment of the invention in which the inverting facets are arranged around a circular path on a disc, FIG. 12 is a cross-section through the embodiment of FIG. 11, FIG. 13 shows how prisms can be located around a disc in slots to allow for correct alignment of the prisms parallel to the path of the film, FIG. 13a is a side view of the arrangement shown in FIG. 13 in which the optical path has been elaborated, FIG. 14 is a plan view of a stereo projector with the cover removed to reveal the internal components, FIG. 15 is a cross-section through the stereo projector shown in FIG. 14, FIG. 16 is a diagrammatic cross-section through a camera which incorporates an immobilizer constructed in accordance with the invention and FIG. 17 is a diagrammatic cross-section through a stereo camera incorporating a compensator constructed as an embodiment of the invention.

DETAILED DESCRIPTION OF DRAWINGS

Figure 1:
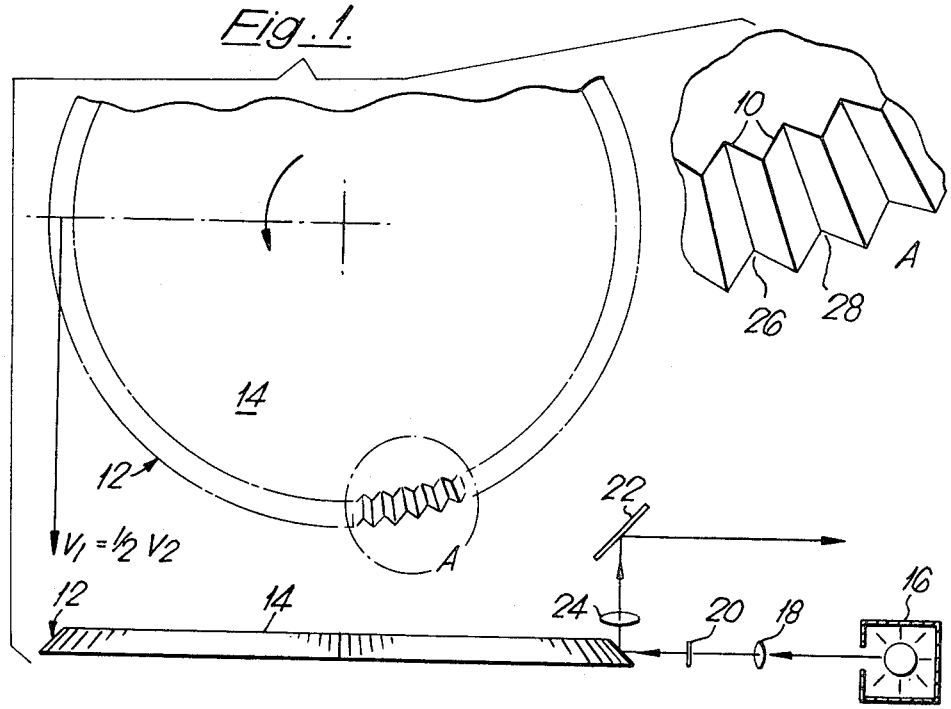

Referring to FIG. 1, image immobilization can be achieved using the principle of the invention by forming a series of mirrored roofs 10 around the bevelled edge 12 of a disc 14. The inclined faces of the roofs are mutually at right angles and the bevelled edge is at 45°.

A light source 16 projects light through a condensing lens 18 to illuminate frames of a film 20 and the light from the film frames impinges on the rotating roofs 10 and is reflected through a focusing lens 24 by mirror 22. From there the light forms a final image on a screen (not shown).

Rotation of the disc 14 at a speed such that the facets move past the film at a speed equal to one half the speed on the film but in the same direction as the film is moving will produce a sequence of frames in the final projected image which remains essentially stationary, the sequence of frames corresponding to light from adjoining frames of the film. The size of the facets is selected so that the width of the facet from one edge 26 to the next edge 28 is equal to one half the film pitch as herein defined. In order to produce conventional projection from a conventional film, all of the facets formed by the roofs 10 must be the same size and have the same optical effect. The means of the width 26 to 28 is used if the edges 26, 28 diverge.

It will be seen that the path of the facets i.e. roofs 10 past the film 20 is not a perfect straight line. However, by selecting a large diameter disc, so the actual path followed by the two or three facets which are actually performing the immobilization at any instant, can be considered to be a straight line.

Figure 2:
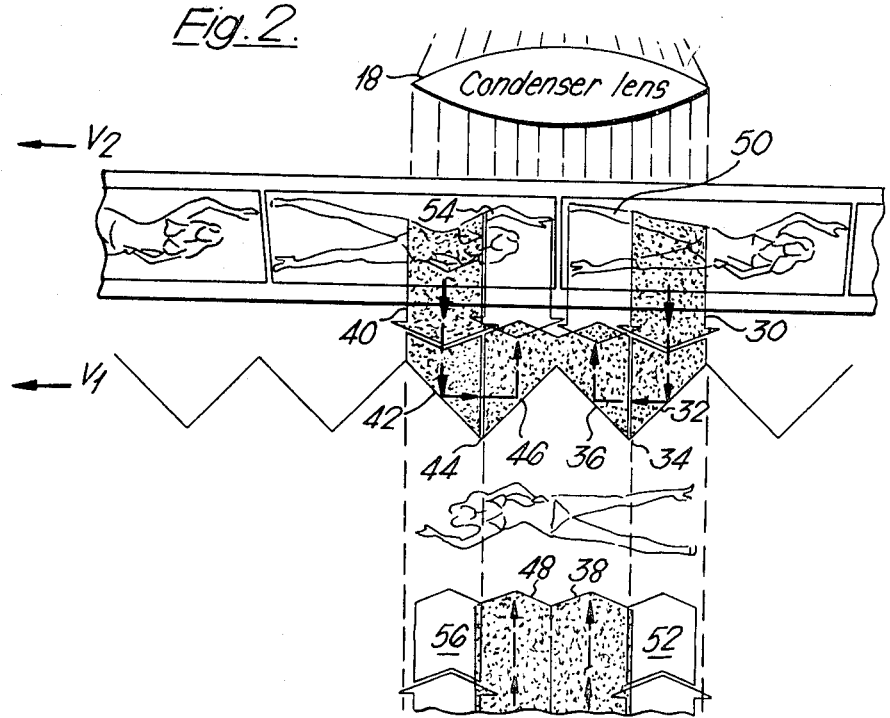

The manner in which the light is received from two adjoining frames of a film and is in turn formed into a final image by the roofs and plane mirror is illustrated in FIG. 2.

Here the condensing lens 18 is shown as illuminating an area of the film equal to just over one film frame height. For simplicity the film is shown such that the illuminated area extends over parts of two adjoining frames.

The light through the first segment 30 is reflected by the plane face 32 of the roof 34 and again by the 90° plane surface 36 of the same roof 34. The 45° bevel allows the light to leave the axis of the initial projection light source and the light which started out in the segment 30 finally appears at 38 from the plane mirror 22.

In a similar manner light from the segment 40 is reflected by the plane mirrored surface 42 of the adjoining roof 44 and again by the plane mirror 46 and produces an inverted image of the light in segment 40 at 48 in the final image.

Light from the segment 50 is inverted and appears by a similar process of reflections at 52 in the final image and light from the segment 54 appears as a result of a similar train of reflections in the section 56 of the light forming the final image.

It will thus be seen that the light in the final image is derived from two frames and the different segments dictated by the different inclined faces of the two optical roofs appear at appropriate points in the final image to produce a composite picture made up from light from appropriate sections of the two adjoining film frames.

It will be seen that the invention is quite different from any conventional image immobilizing device in which a shutter would normally have cut out the light from passing through the film whilst the two frames occupy the position as shown in FIG. 2 relative to the condenser lens and projection optics.

It also illustrates how the invention differs from the previous proposals for image immobilizers using continuous film speed in that in all such immobilizers either the pairs of reflecting surfaces are at an angle other than 90° or rotate in a different direction relative to the film in an attempt to immobilize the light from each frame and track that light as it moves through the optical axis of the projector.

Figure 3:
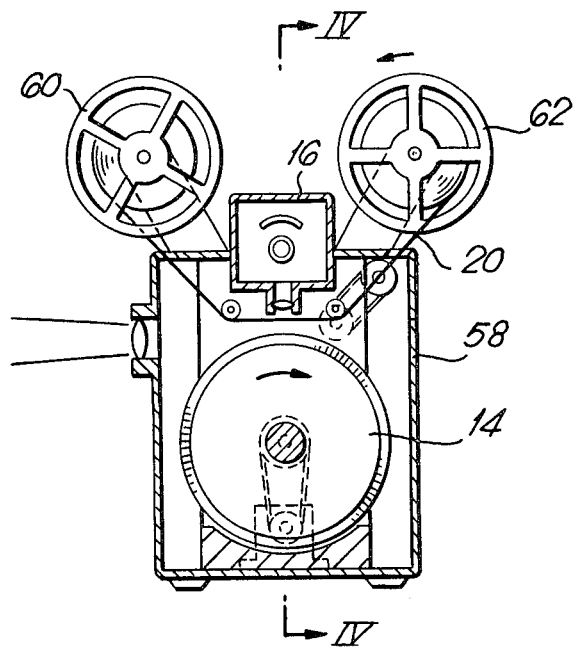
Figure 4:
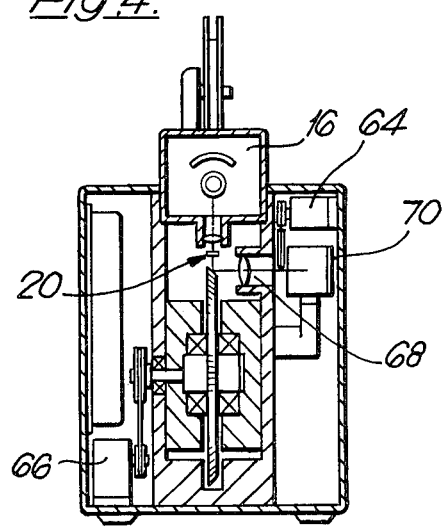

FIG. 3 shows how a disc 14 can be mounted within a projector housing 58. The light source 16 is mounted above the film path and the film 20 is transferred from the spool 60 to the take-up spool 62. The spool 62 is driven by an electric motor 64 and the disc 14 by an electric motor 66. The projection lens is located at 68 and a plane mirror or right-angle prism 70 serves to deflect the light forming the final projected image into alignment with the normal front to back direction of the apparatus.

All the embodiments so far rely on the fact that a short length of the circumference of a large diameter disc can be considered as a straight line. Clearly this must always be an approximation and the arrangement shown in FIGS. 5 and 6 allow the inverting facets (shown as a series of Amici prisms) to pass in a truly parallel path relative to the film. The prisms are denoted by reference numeral 70 and are slideable around a path 72 the majority of which may be circular in outline but the section of which runs parallel to the film path is straight at 74. The prisms are attached to a flexible band or chain which can follow the differential curvature around the track 72.

Figure 6:
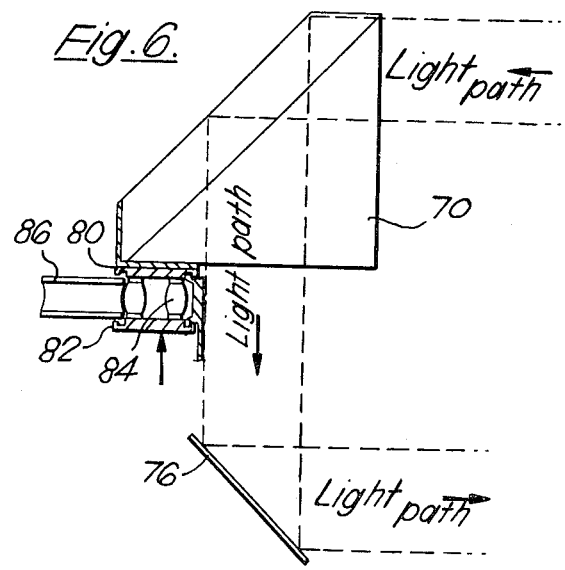

In other respects the arrangement is similar to that shown diagrammatically in FIG. 1. FIG. 6 shows the light path and the 45° mirror 76 for projecting light through the projection lens 78, which may instead be located between the prisms 70 and the plane mirror 76.

The mounting for the individual prisms is shown in detail in FIG. 6 and comprises upper and lower plates 80 and 82 with rollers 84 extending there between. In the region of the illuminated segment of the film path the mountings are driven by a drive 86 so that the prisms move with a linear speed V1 equal to one half the linear speed of the film V2.

Figure 7:
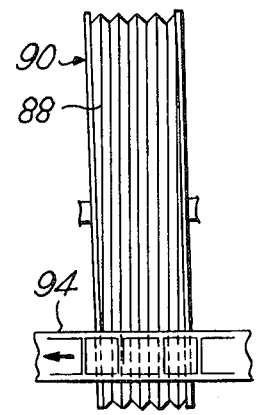
Figure 8:
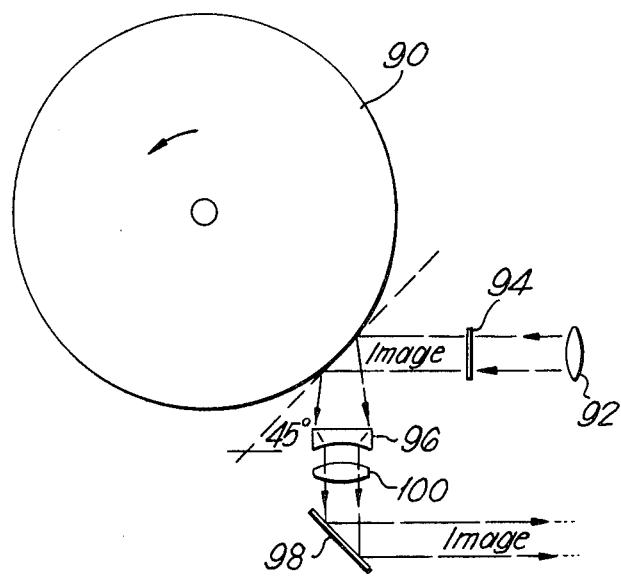

FIGS. 7 and 8 illustrate an alternative embodiment in which the right-angle plane reflecting surfaces of the roofs and prisms of the previous embodiments are replaced by a 90° helical groove 88 formed around the drum 90. The drum is positioned relative to a projection system incorporating a condenser lens 92 and film 94 such that light passing through the film is reflected at 90° from the surface of the drum 90. The 90° reflecting surfaces of the groove produce the required inversion and a corrective lens 96 corrects for any aberration due to the curvature.

An angled mirror 98 and projection lens 100 form the final image.

By increasing the width of the entrance aperture of the reflecting inverters (i.e. the spacing between lines 26 and 28 in FIG. 1) so that the optical roof or Amici prism extends over a complete film pitch, it will be found that the image formed from the light from any one set of inverters is derived only from alternate frames of the film. By locating a second set of light reflecting inverters adjoining the first set a second series of images can be obtained corresponding to the light from the frames not seen by the first set of inverters.

This principle is illustrated in FIGS. 9a to 9d, which show the successive positions of a film 100 moving past a condenser lens 102 which is capable of illuminating up to three film frames. Beyond the film are located optical roofs or prisms the entrance aperture of which corresponds to the film pitch and the light from the different sections of the different frames is shown by different drawing conventions so that the different reflections can be followed from one view to the next. The film moves past the condenser lens at a speed V1 whilst the array of reflecting inverters moves in the same direction at one half the speed. Whilst the film moves through a distance of one film pitch (i.e. one frame) the line of reflecting inverters has only moved through half that distance as will be seen by comparing FIGS. 9a and 9c.

The result is that light corresponding to even numbered frames is projected through the left-hand lens 104 and the light from odd numbered frames is projected through lens 106.

The principle can be used to simultaneously project two series of frames to produce a stereoscopic effect or alternatively can be used to project two films which have been interlaced on the one film stock the one through one projection system and the other through the other projection system simultaneously.

By altering the entrance aperture width of the reflecting inverters, light corresponding for example to every third picture in the film can be isolated.

Figure 10B:
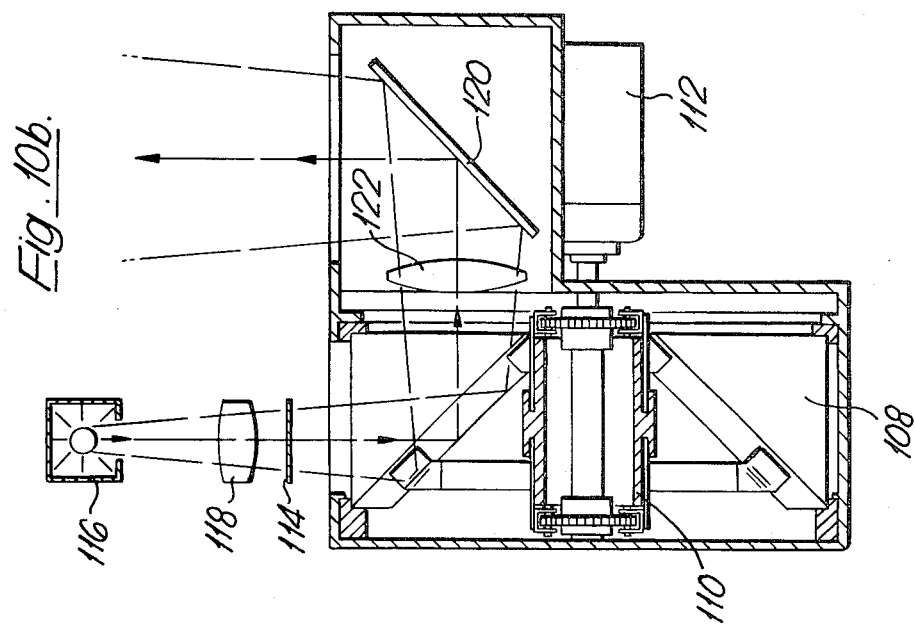
Figure 10A:
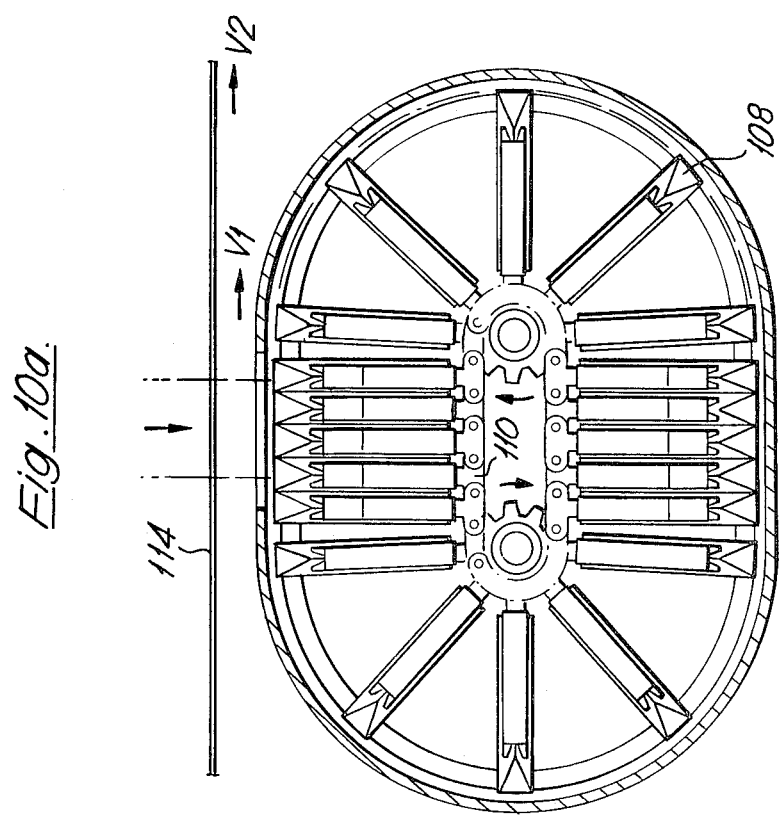

FIGS. 10a and 10b illustrate a further embodiment of the invention in which a plurality of Amici prisms 108 are carried by a caterpillar generally designated 110 which is driven by a motor 112. The prisms are aligned with a straight line film path 114 over part of their travel and light from a source 116 and condensing lens 118 illuminates a length of the film corresponding to more than one film pitch and light corresponding to more than one film pitch and light corresponding to the immobilised images is reflected by the plane mirror 120 after passing through a focusing lens 122.

Figure 11:
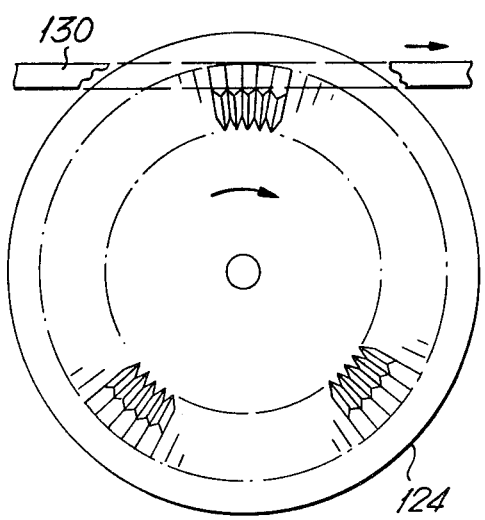
Figure 12:
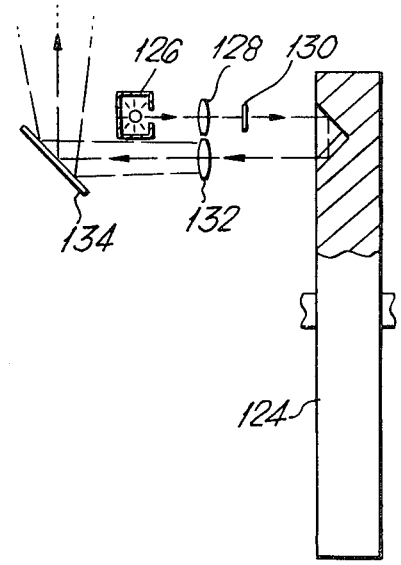
Figure 9A:
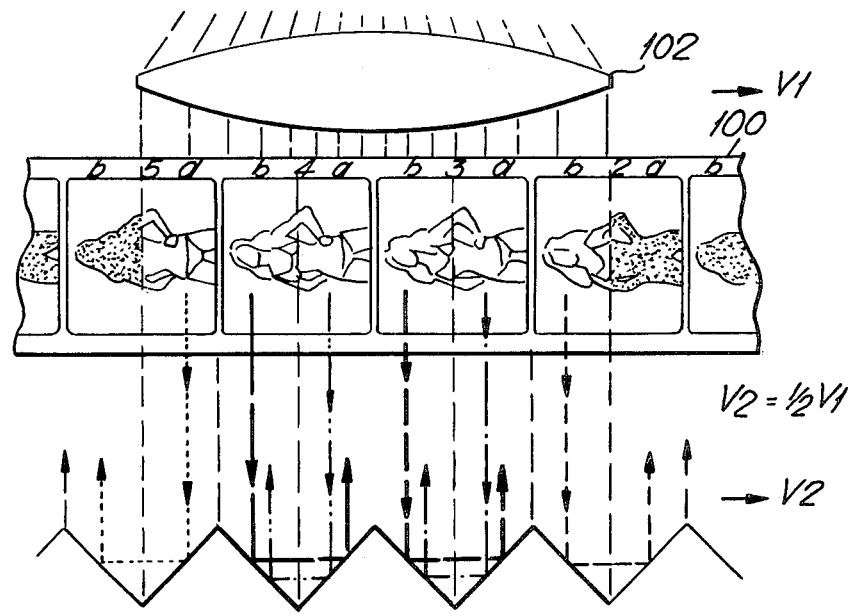
Figure 9B:
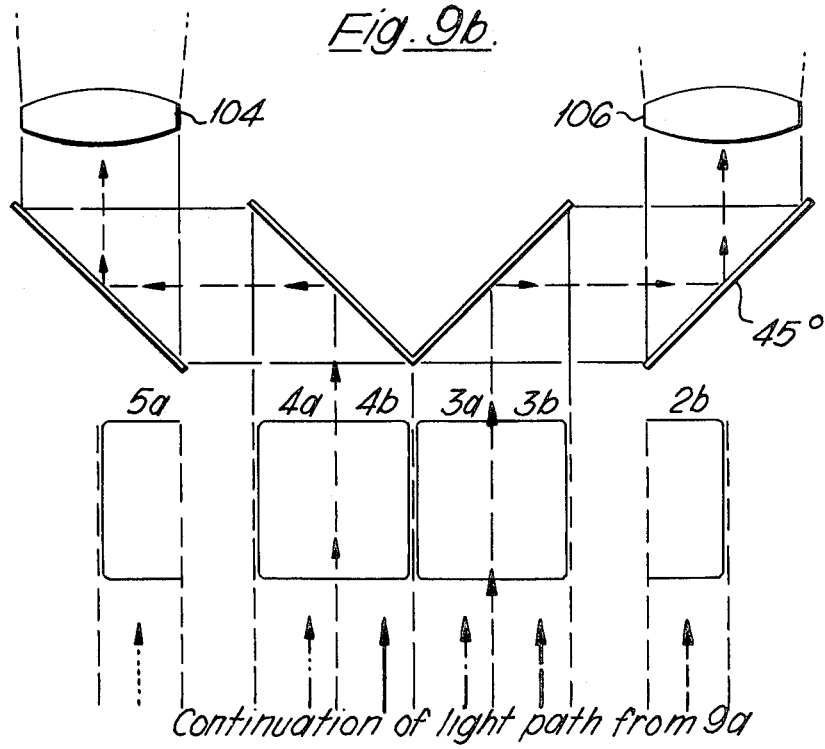
Figure 9C:
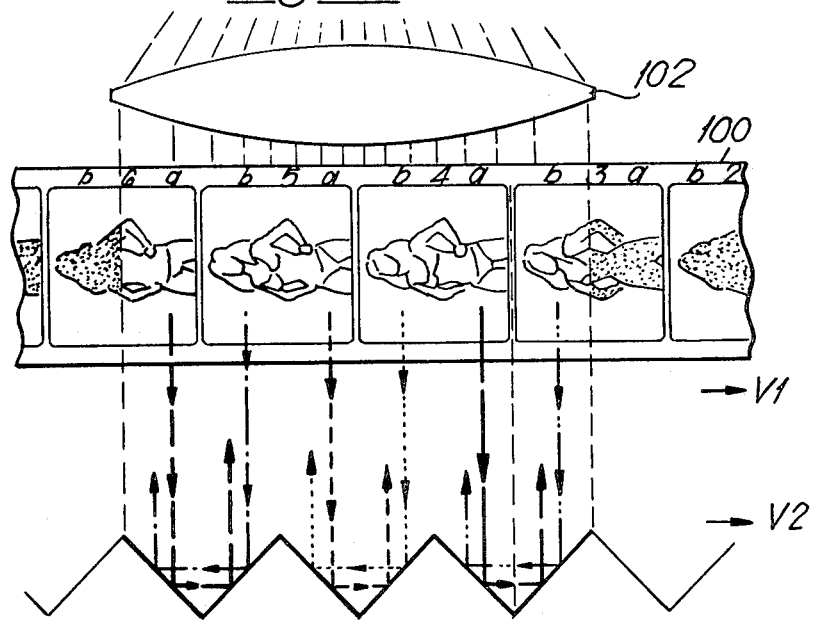
Figure 9D:
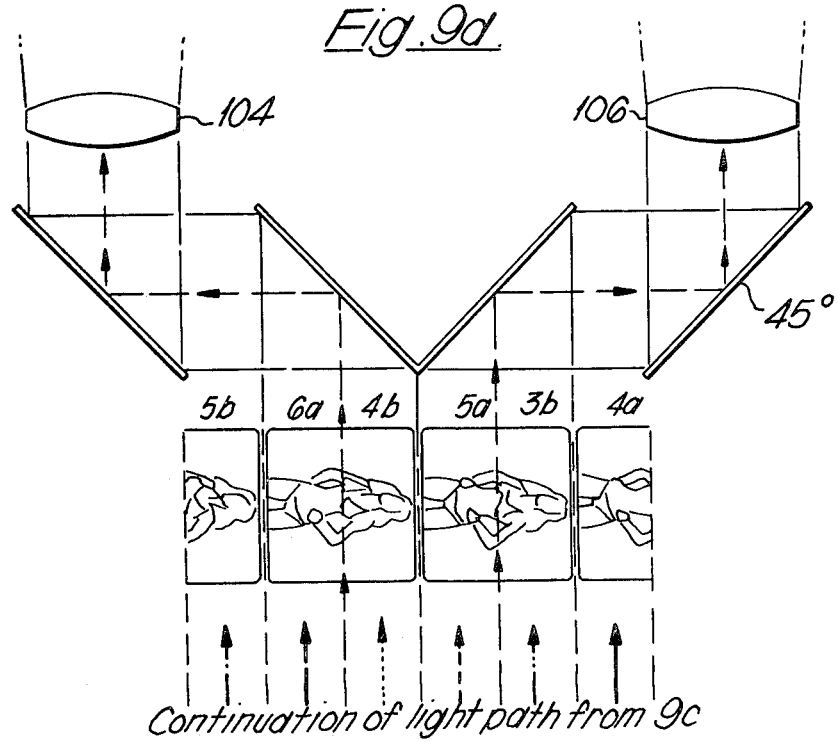

FIGS. 11 and 12 illustrate a further embodiment in which a plurality of similar corner cube indents are arranged circularly in the face of a disc 124. Light from a source 126 and condensing lens 128 illuminates the frame of a film 130 which light is inverted by the corner cubes and reflected through a projection lens 132. A plane mirror or prism 134 is provided to re-direct the light to a screen.

The device suffers from the same disadvantage as that shown in FIGS. 1 to 4 in that the path of the corner cube indent relative to the film is not a true straight line but by using a disc of sufficiently large diameter relative to the size of the film frames so an acceptable approximation to a straight line can be obtained.

Figure 13:
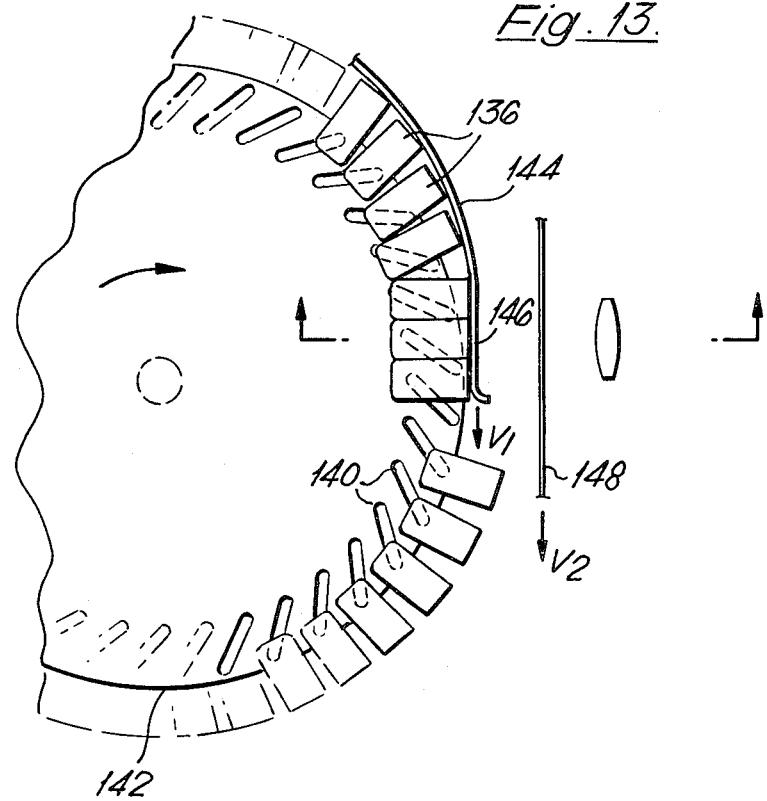
Figure 13A:
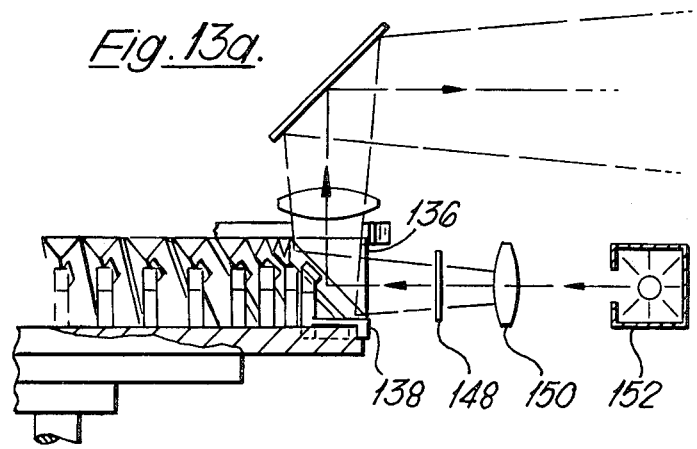

FIGS. 13 and 13a refer to a still further embodiment in which prisms 136 are mounted on blocks 138 which are slidable in a series of slots 140 located adjacent to the periphery of a driven disc 142.

The slots 140 are angled so that the prisms and their mountings can slide during rotation of the disc and a guide 144 serves to pick up and align the plane faces of the prism over a short length of the circular path otherwise followed by the prisms. The rotation of the disc 142 is carefully selected so that the linear speed of the prisms 136 along a straight line segment as determined by the section 146 of the guide 144 is equal to one half the linear speed of the film 148 which is located close to and parallel to the straight line segment determined by the guide 146.

Figure 14:
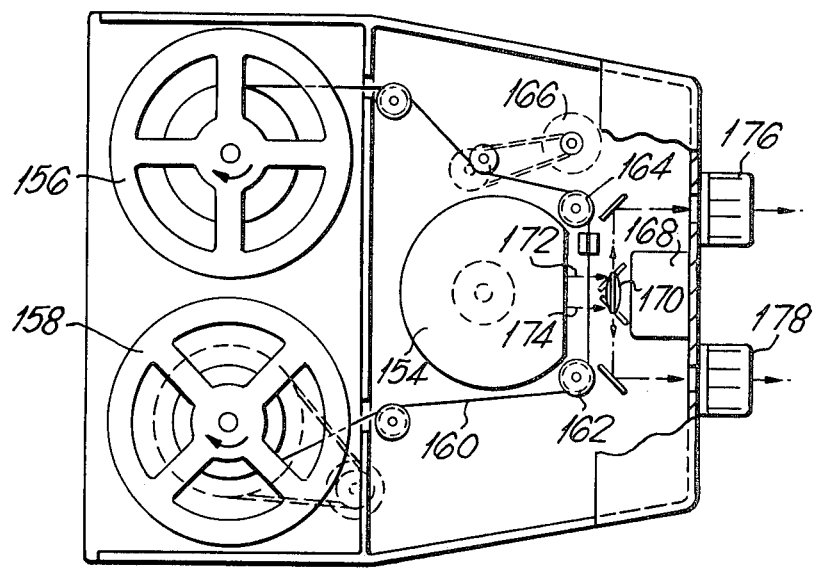

The latter is either apertured or extends only over an edge region of the prisms so as not to interfere with the passage of light from the film which is illuminated by a condensing lens 150 and light source 152 as shown in FIG. 14.

Figure 5:
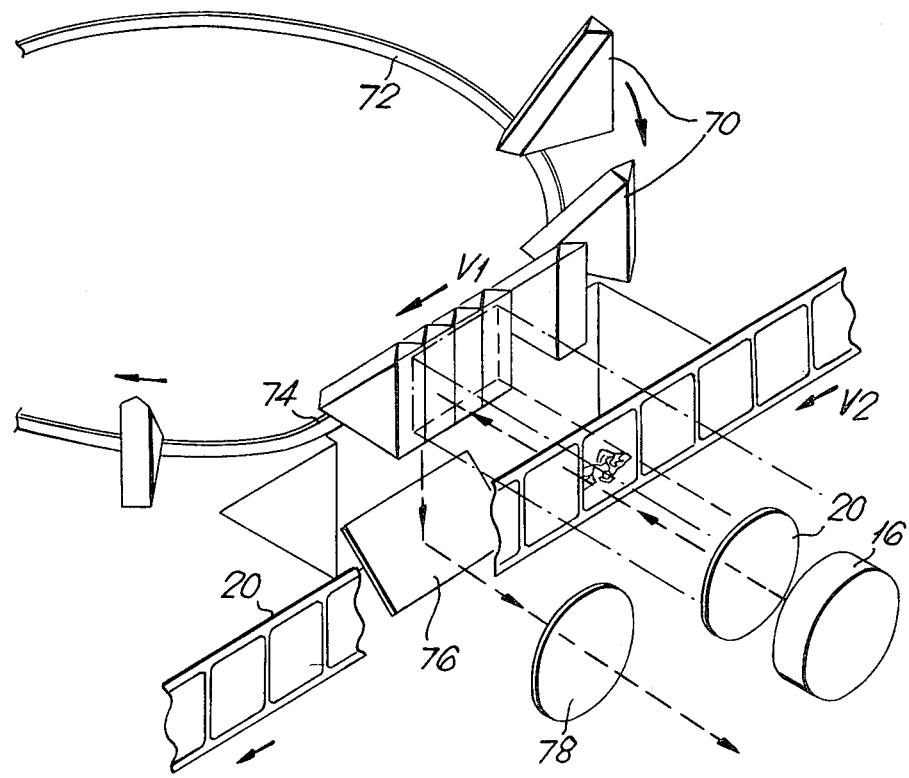
Figure 15:
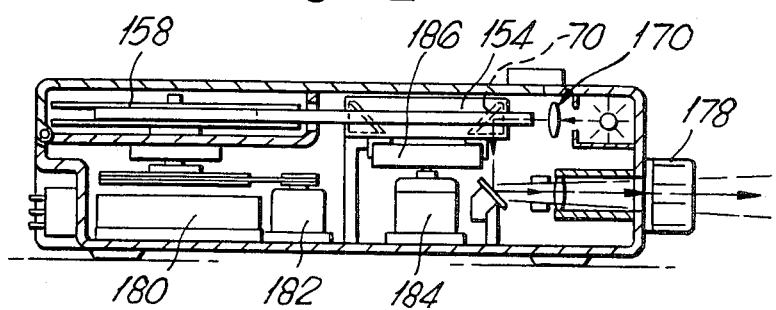

FIGS. 14 and 15 illustrate a stereo projector in which the film movement is arrested using an immobilizing compensator of the type shown in FIGS. 5 and 6 of the drawings. This immobilizer is not shown in detail but is denoted by reference numeral 154.

The projector includes a film spool 156 and take-up spool 158. The film 160 extends therebetween and is guided around sprocket wheels to extend in a straight line between two sprocket wheels 162 and 164. At least one of the sprocket wheels is driven and drives are conveniently provided to both spools 156 and 158. A capstan drive motor is denoted by reference numeral 166.

A projection lamp (not shown) is contained within a housing 168 and light therefrom passes through a condensing lens 170 to illuminate a segment of the straight line path of the film 160. Light from the illuminated frames of the film passes into the immobilizer 154 and after inversion and reflection leaves as two distinct beams 172 and 174. These are reflected by prisms or plane mirrors for projection through two matched projection lenses 176 and 178.

As explained with reference to FIGS. 9a to 9d, the two beams 172 and 174 contain light from alternate sets of frames along the length of the film and by arranging that the alternate frames along the film relate to the same scene but viewed from the two appropriate angles, so a stereoscopic effect can be obtained when the two series of images are projected simultaneously.

The projector shown in FIG. 14 is shown in cross-section in FIG. 15. An electronic speed control unit 180 serves to control the pulse frequency to synchronous motors 182 and 184 and to the capstan drive motor 166 (not shown in FIG. 15). The motor 184 drives the array of prisms by prism drive mechanism 186 and the prisms 70 are shown in dotted outline in the cross-section view of FIG. 15.

The projector shown in FIGS. 14 and 15 is particularly appropriate to super 70 mm film in which the frames are orientated through 90° relative to the normal orientation of the frame along the length of the film. This allows projection to be performed from the film running in a generally horizontal manner as shown. In the event that a standard format film were used, additional prisms or mirrors would be required to orientate the light forming the two images through 90° in each case.

Figure 16:
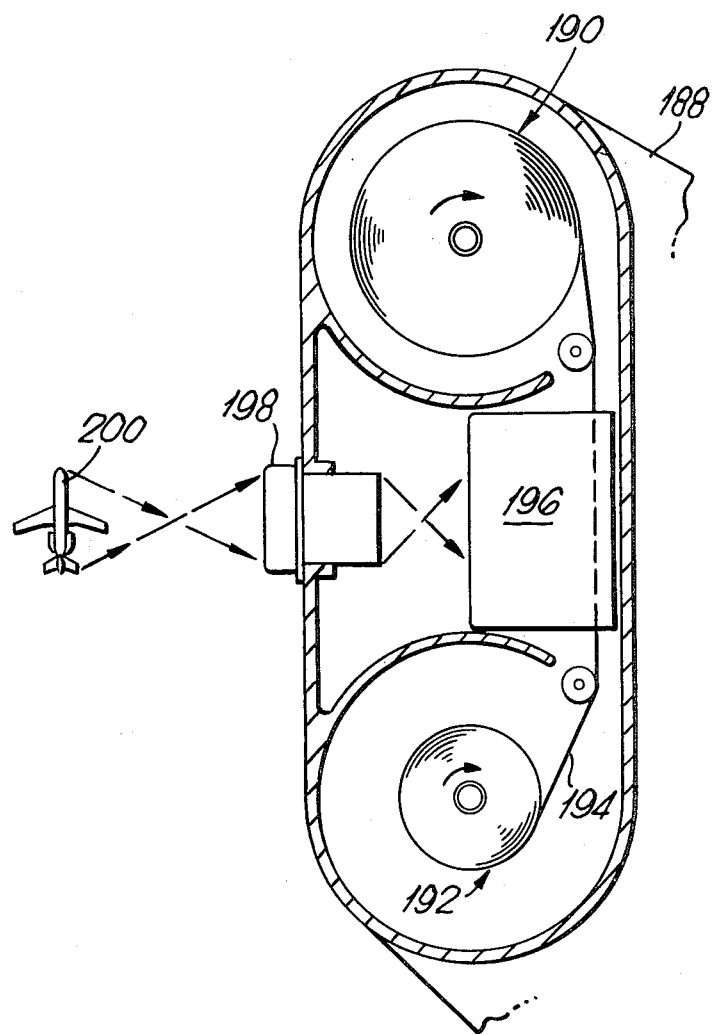

FIG. 16 shows how an immobilizer operating in accordance with the invention can be used in a camera so as to obtain a sequence of exposures on a continuously moving length of unexposed film. A camera comprises a housing 188 carrying two spools, a first spool 190 carrying the unexposed film and a take-up spool 192 serving to collect the exposed film. Drive means (not shown) produces continuous movement of the film 194 through an immobilizer 196. This is typically of the form shown in FIGS. 5 and 6 of the drawings in which the projection lens 78 now becomes a focusing lens of the camera shown as 198 in FIG. 16 and the condensing lens of FIGS. 5 and 6 is now required.

Light from an object denoted by an aeroplane 200 is focused by the focusing lens assembly 198 onto a region across which the plane faces of the prisms move and light from the prism is reflected via plane mirrors onto the unexposed film.

Although not shown a shutter is provided with an interlock such that the shutter is only opened when the film is moving at the required continuous speed through the immobilizing compensator 196.

A similar arrangement is shown in FIG. 17 for exposing alternate regions along the length of a film stock 194 as it travels continuously (i.e. without intermittent motion) from one spool 190 to another spool 192. The film passes through an optical immobilizing compensator 202 which internally is constructed on the principle of the device shown in FIGS. 5 and 6 of the drawing but in which the size of the facet is increased so that the width of each facet corresponds to the film pitch and the result is that the light from the focusing lens 204 is exposed on alternate areas of the film 194 and light from the focusing lens 206 is exposed on the remaining interlaced areas of the film.

Subsequent projection of the film using an arrangement having optical inverting reflectors of appropriate widths will result in two images being reconstructed corresponding to the two views of the original object (shown as aeroplane 200 viewed from two different angles).

We claim:

1. An optical device for compensating for the movement of a cinematographic film along a film path, a region of which is crossed by a light path, comprising:
   a plurality of image inverting facets each of which has two mutually perpendicular plane light reflecting surfaces, said facets being oriented so as to deflect all light passing therethrough, for inverting light entering the facets, and each facet being smaller in the direction of film movement than a single film frame repeat distance and having a pitch in the direction of film movement which is substantially one half the film frame repeat distance;
   means for defining a path along which said plurality of facets can move, coacting points of said film and facet path being substantially equidistant from one another in the region where said film path and said facet path cross said light path;
   means for moving said plurality of facets along said facet path with each facet in turn crossing said light path, the movement of said facets having a component of motion in the same direction as the movement of said film, the speed of said component being different from the speed of said film in the region where said facets and said film cross said light path and is substantially one half the speed of said film,
   each said facet being constructed to interact with more than one said film frame as it crosses said light path and each said film frame being constructed to interact with more than one said facet as it crosses said light path, wherein at no time does a complete immobilized image formed from the film frames relate identically to one of the film frames contributing to that immobilized image.

2. An optical device as set forth in claim 1 wherein said component of movement of said facets in the direction of film movement is exactly one half the speed of said film.

3. An optical device as set forth in claim 1 wherein each said facet is an Amici prism.

4. An optical device as set forth in claim 1 wherein each said facet includes a third plane light reflecting surface.

5. An optical device as set forth in claim 1 wherein the facet pitch in the direction of film movement is exactly one half the film frame pitch.

6. An optical device as set forth in claim 1 including a camera for exposing a sequence of images on a length of unexposed film, comprising lens means for focusing light along said light path through said facets and onto said region of said film.

7. An optical device as set forth in claim 1 including a projector for illuminating and projecting a sequence of frames on a length of exposed film, including a source of light for forming a light beam along said light path to illuminate said film and lens means for focusing light remaining in said light beam after passing through said film and said facet.

8. An optical device as set forth in claim 1 wherein both said film path and said facet path are straight lines parallel to each other in the region where said film and facet paths cross said light path.

9. An optical device as set forth in claim 1 or 8 wherein there is a separate coupling between each said facet and said means for moving said facet so as to permit relative movement between said facets as they move along said facet path.

10. An optical device as set forth in claim 9, wherein said coupling between each said facet and said means for moving said facet allow for deceleration of each said facet before it crosses said light path.

11. An optical device as set forth in claim 9 wherein said coupling between each said facet and said means for moving said facet allows for acceleration of each said facet after it crosses said light path.

12. An optical device as set forth in claim 1 wherein said facets are formed as a continuous spiral around the circumference of a cylinder whereby rotation of said cylinder about a longitudinal axis causes, in the region of said light path, successive turns of said spiral to act as said facets and cross said light path in the same direction as the film movement and generally parallel to said film.

13. An optical device as set forth in claim 1 wherein said facets are arranged around the circumferential edge of a disc and the vertex line of the two mutually perpendicular reflecting surfaces of each said facet is inclined with respect to the axis of rotation of said disc.

14. An optical device for compensating for the movement of a cinematographic film along a film path, regions of which are crossed by m nonintersecting light paths wherein m equals an integer greater than 1, comprising:
a plurality of image inverting facets each of which has two mutually perpendicular plane light reflecting surfaces, oriented so as to deflect all light passing therethrough, for inverting light entering each said facet, each said facet having a pitch in the direction of the film movement which is substantially $m \times \frac{1}{2}$ the film frame repeat distance;
means for defining a path along which said plurality of facets can move, coacting points of said film and said facet paths being substantially equidistant from one another in the regions where said film path and said facet path cross said light paths;
means for moving said plurality of facets along said facet path with each said facet in turn crossing said light paths, the movement of said facets having a component of motion in the same direction as the movement of said film, the speed of said component of motion being different from the speed of said film in the regions where said facets and said film cross said light paths and is substantially one half the speed of said film,
each said facet being constructed to interact with more than one said film frame as it crosses each of said light paths and each film frame being constructed to interact with more than one facet as it crosses each of said light paths, wherein each interaction between said film and said facets at a light path at no time forms an immobilized image which contains portions of a film frame which contributes at the same time to another immobilized image in another interaction between film and facets at a different light path, and wherein at no time does an immobilized image formed from said film frames contain portions from adjacent frames of said film.

15. An optical device as set forth in claim 14 wherein two of said m light paths are exactly adjacent each other and parallel to each other.

16. An optical device as set forth in claim 14 wherein said component of movement of said facets in the direction of the film movement is exactly one half the speed of said film.

17. An optical device as set forth in claim 14 wherein each said facet is an Amici prism.

18. An optical device as set forth in claim 14 wherein each said facet includes a third light reflecting surface.

19. An optical device as set forth in claim 14 wherein the facet pitch in the direction of the film movement is exactly $m \times \frac{1}{2}$ the film frame pitch.

20. An optical device as set forth in claim 14 including a camera for exposing sequences of images on a length of unexposed film, comprising lens means for focusing light along the m light paths through said facets and onto said regions of said film.

21. An optical device as set forth in claim 14 including a projector for illuminating and projecting sequences of frames on a length of exposed film, wherein at least one light source is provided to form light beams along the m light paths to illuminate regions of said film, and lens means for focusing light remaining in said light beams after passing through said film and said facet into m light beams.

22. An optical device as set forth in claim 21 wherein there are two light beams along said light path and said lens means focuses the light passing through said film and said facets into two images which are superimposed on a projection area.

23. An optical device as set forth in claim 21 wherein said m light beams that pass through the film and the facets are focused by the lens means into m images which are in a linear array at the projection area.

24. An optical device as set forth in claim 14 wherein both said film path and said facet path are straight lines parallel to each other in the regions where said film and said facet paths cross said m light paths.

25. An optical device as set forth in claim 14 or 24 wherein there is a separate coupling between each said facet and said means for moving said facets so as to permit relative movement between said facets as they move along said facet path.

26. An optical device as set forth in claim 25 wherein said coupling between each said facet and said means for moving said facet allows for deceleration of each said facet before it crosses a light path.

27. An optical device as set forth in claim 25 wherein said coupling between each said facet and said means for moving said facet allows for acceleration of each said facet after it crosses a light path.

28. An optical device as set forth in claims 1 or 14 wherein the speed of said component is between 35% and 65% of the speed of said film.

* * * * *